(12) United States Patent
Boehl et al.

(10) Patent No.: US 8,499,113 B2
(45) Date of Patent: Jul. 30, 2013

(54) CIRCUIT CONFIGURATIONS AND METHOD FOR CONTROLLING A DATA EXCHANGE IN A CIRCUIT CONFIGURATION

(75) Inventors: Eberhard Boehl, Reutlingen (DE); Ruben Bartholomae, Reutlingen (DE); Uwe Scheurer, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 12 days.

(21) Appl. No.: 13/138,607

(22) PCT Filed: Feb. 24, 2010

(86) PCT No.: PCT/EP2010/052309
§ 371 (c)(1),
(2), (4) Date: Oct. 21, 2011

(87) PCT Pub. No.: WO2010/108745
PCT Pub. Date: Sep. 30, 2010

(65) Prior Publication Data
US 2012/0030395 A1    Feb. 2, 2012

(30) Foreign Application Priority Data
Mar. 26, 2009    (DE) .................. 10 2009 001 898

(51) Int. Cl.
*G06F 13/00*    (2006.01)
(52) U.S. Cl.
USPC .......................................... 710/317; 340/2.1

(58) Field of Classification Search
USPC ................... 710/317, 316, 104–125; 340/2.1
See application file for complete search history.

(56) References Cited

U.S. PATENT DOCUMENTS

| 5,455,917 | A  | 10/1995 | Holeman et al. |
| 6,457,078 | B1 | 9/2002  | Magro et al.   |
| 2003/0105899 | A1 | 6/2003 | Rosenbluth et al. |

FOREIGN PATENT DOCUMENTS

| JP | 10-091577 | 4/1998 |
| JP | 2005-228311 | 8/2005 |
| WO | PCT/EP2008/060493 | 2/2010 |
| WO | WO 2009/040179 | 9/2010 |

OTHER PUBLICATIONS

(www.arm.com/products/solutions/AMBAHomePage.html).

*Primary Examiner* — Clifford Knoll
(74) *Attorney, Agent, or Firm* — Kenyon & Kenyon LLP (57) ABSTRACT

In a method for controlling a data exchange between at least one set of data sinks and at least one set of data sources in circuit configurations and circuit sequences, which circuit configurations have at least one arbitration unit, the arbitration unit selects a first data sink (data sink arbitration) and a first data source (data source arbitration) according to a predefined sequence, and outputs an address of a first data source and a request signal and an address of a first data sink and a validity signal. Data of the first data source are stored in the first data sink.

16 Claims, 4 Drawing Sheets

CIRCUIT CONFIGURATIONS AND METHOD FOR CONTROLLING A DATA EXCHANGE IN A CIRCUIT CONFIGURATION

BACKGROUND OF THE INVENTION

1. Field of the Invention

The present invention relates to circuit configurations and methods for controlling a data exchange in a circuit configuration.

2. Description of Related Art

Bus systems are often used for the purposes of data exchange in data processing systems (computer and microprocessor systems, control units, peripheral units and other information processing systems). One such bus system is the AMBA bus, including its variants AHB, ASB and APB (www.arm.com/products/solutions/AMBAHomePage.html).

The AHB bus is a multimaster bus, in which individual masters are able to request the bus via a bus request. In the event of multiple requests, the arbiter decides which master the bus will be assigned to for its data transfer. The selected master addresses via an address a slave to which it may transmit data via a write bus or from which it receives data via a read bus. The data transmission may last for multiple clock cycles and is terminated by a ready signal, which releases the bus again for the next master request. For example, the CPU (central processing unit) or a DMA (direct memory access) could function as the master which retrieves data from a memory or transmits data to a peripheral unit. The transmission pathways are each controlled by an address, which may change constantly.

Another data transmission option is data routing, as described in PCT/EP2008/060493, which solves the problem of distributing data to configurable addresses (i.e., fixed at run-time). The available data from a data source are written in succession to a fixed address in a RAM (random access memory) from which the data sink (destination) retrieves the data cyclically. With each retrieval of data, the corresponding data region is marked as read and is thus free for the next data from the same source. This type of data distribution is advantageous when there is a fixed connection between a data source and a data sink and data are exchanged as often as desired.

In data exchange with the aid of an AMBA bus system, each master reports a request to the bus system and a decision is made by an arbiter as to which master the bus will be assigned to. The data transfer is therefore very flexible but also very complex. However, the (aforementioned) data routing is simpler because each participant is simply queried one after the other as to whether it has a request and they are then processed one after the other. Write requests and read requests for RAM are differentiated here. In a write request, data from the source are retrieved and written into the RAM exactly when the target address in the RAM is free. Conversely, data are processed in a read request only when the data are valid and the datum is marked as read during reading.

One disadvantage of this routing is that k cycles are needed for writing into the RAM for each data transfer from a source to a sink, and, in addition, l cycles are needed for reading out of the RAM. If n data sources and m data sinks are processed in succession, a run-through needs up to $t=n*k+m*l$ cycles. If no request is present, the query of the source or sink is shortened to zero cycles. The cycle time, i.e., the time until the same source or sink is processed again, is thus dependent on the number of requests. The cycle time is too long for some applications and the variable cycle time is unfavorable for others.

BRIEF SUMMARY OF THE INVENTION

The method according to the present invention for controlling a data exchange in a circuit configuration and the circuit configurations according to the present invention have the advantage over the data routing according to the related art that they save the RAM as a buffer storage and shorten the cycle time to $t=m$ cycles because only data sinks are queried and only one cycle is needed for each query. In addition, the cycle time may be selected to be constant because the query of the data sinks may be independent of whether or not there is a request.

However, a great deal of circuit complexity is eliminated in comparison with the AMBA bus from the related art, because a simpler arbitration is possible according to the round robin principle, for example, because for the arbitration it is not necessary to take into account whether there is a request because only read access may be provided because the reading may always take place from configurable addresses (fixed at run-time) and because the addresses for the n data sources may need only Id(n) bits (continuous numbering of the sources).

The method according to the present invention is thus particularly rapid and requires relatively little circuit complexity in comparison with the related art.

In an advantageous embodiment, at least one data node functions as at least one data sink and also as at least one data source. The method is thus not limited to plain data sinks or data sources. For data exchange according to the present invention, such a functional unit is to be considered as divided into the corresponding number of data sinks and data sources.

In addition, it is advantageous if the data exchange between multiple (sub)sets of data sinks and/or multiple (sub)sets of data sources may take place through the use of at least one arbitration unit per data sink (sub)set (in the case of data sink arbitration) or per data source (sub)set (in the case of data source arbitration). This permits more flexible data transfer among various groups of data sources and data sinks. In another advantageous embodiment, a few of the multiple (sub)sets may also overlap for an even more flexible data exchange.

In another advantageous exemplary embodiment, in the case of data sink arbitration, the request signal of the selected (first) data sink influences the validity information of the selected (first) data source. For example, it is thus possible to determine by the message of the data sink to the source whether the message in the data source is to remain valid or is to become invalid, so that desired multiple reading operations, for example, may be enabled but undesired multiple reading operations may be prevented. In the same way, in the case of data source arbitration, an influence on the validity information of the selected (first) data source through an acknowledgement signal of the selected (first) data sink may be provided in an advantageous embodiment having the same advantages as those just described in the case of data sink arbitration.

It is also advantageous if there is the possibility that a request signal of a data node (specifically a data sink) is able to act on the further switching of the arbitration unit. Although the advantage of a constant cycle time may be given up in this way, this advantageously yields additional transmission options, for example, that a continuous data transfer takes place between a data source and a data sink for a certain period of time during which the arbitration unit does not advance further.

In another preferred embodiment, the arbitration unit arbitrates a certain data sink or a certain data source in the case of a predefined event (for example, determined/controlled by the CPU) and selects the following data sinks and data sources further according to the predefined sequence only after this forced arbitration. It is therefore possible to depart from the predefined sequence in a flexible manner in the case of an important event, for example, a time-critical event, and for the method to be resumed again with a fixed sequence after this unscheduled arbitration.

In a particularly advantageous exemplary embodiment, data from the data exchange may be delayed through pipeline registers or similar delay units or delay methods in the circuit configuration, so that a data exchange according to the present invention is possible even if read and/or write operations need more time than that allowed by the cycle of arbitration.

DETAILED DESCRIPTION OF THE INVENTION

The terms "data source," "data sink" and "data node" are used in the description with the following meanings: a data source is a data node providing data and a data sink is a data node receiving data. It is pointed out that a functional unit mounted in a housing or on a chip, for example, may function both as a data source and as a data sink and may even do so in multiple cases. This unit is then to be considered as divided into the corresponding number of data sinks and data sources for the data exchange according to the present invention between data sources and data sinks.

Figure 1:
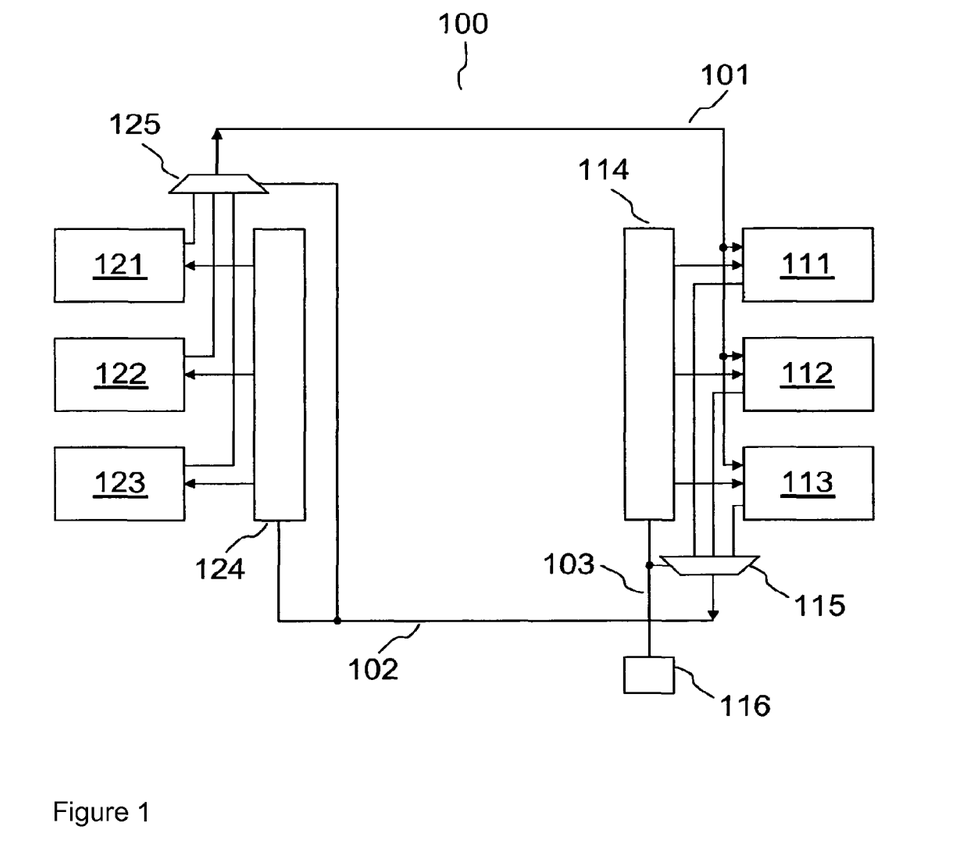
FIG. 1 shows a circuit configuration for a data exchange with arbitration of the data sinks by a counter.

FIG. 1 shows a specific embodiment of a circuit configuration according to the present invention. Circuit configuration 100 has data sinks 111, 112 and 113 and data sources 121, 122 and 123. A 1-of-m decoder 114, a multiplexer 115 and a counter 116 are assigned to data sinks 111, 112 and 113, and a 1-of-n decoder 124 and a multiplexer 125 are assigned to data sources 121, 122, 123. The 1-of-m decoder 114 has access to data sinks 111, 112 and 113 for an address-controlled selection of data sinks 111, 112 and 113 with the aid of the select signal and is connected to a select input of multiplexer 115 and also to counter 116 via a communication link 103. Data sinks 111, 112 and 113 are each connected to an input of multiplexer 115. The output of multiplexer 115 is connected to a communication link 102, this communication link 102 being connected to 1-of-n decoder 124 as well as to a select input of multiplexer 125. The 1-of-n decoder 124 has access to data sources 121, 122 and 123 for an address-controlled selection of data sources 121, 122 and 123. Data sources 121, 122 and 123 are each connected to an input of multiplexer 125. In addition, the output of multiplexer 125 is connected to a communication link 101, this communication line 101 being connected to data sinks 111, 112 and 113.

The circuit configuration according to the present invention includes in general n+m data nodes (number of data sources n>0, number of data sinks m>0); in the exemplary embodiment in FIG. 1, it includes 3+3=6 data nodes 111, 112, 113, 121, 122 and 123, where n=3 is the number of data sources 121, 122 and 123, and m=3 is the number of data sinks 111, 112, 113. In addition, an arbitration unit, for example, a modulo-m counter 116 as a selector unit for arbitration in FIG. 1, belongs to the circuit configuration. In this exemplary embodiment, counter 116 increments the value of counter 116 up to m−1 at a predefinable cycle and then begins again at 0. Precisely one data sink is selected via the 1-of-m decoder 114 from data sinks 111, 112, 113 with each state of counter 116. This selected data sink sends an address and a read request signal to multiplexer 115, this multiplexer 115 forwarding the data of the selected block of the selected data sink together with the address and the read request signal via communication link 102.

In the 1-of-n decoder 124, precisely one data source is selected from data sources 121, 122 and 123 from the address and the read request is made available to this data source via the data-ready signal. A validity signal is formed from the read request and the data-ready signal, characterizing the valid data at precisely the time when both the read request and the data-ready signal are active. This selected data source outputs the requested data to multiplexer 125, thus ensuring that precisely the data of the selected data source are forwarded together with the validity information (acknowledgement signal) via communication link 101 to all data sinks 111, 112, 113. The selected data sink saves the valid data.

In FIG. 1, a 1-of-m decoder 114, a 1-of-n decoder 124, multiplexers 125 and 115 for selection of data sinks 111, 112 and 113 and data sources 121, 122 and 123, and a counter 116 for arbitration of data sinks 111, 112 and 113 as shown as an example. As an alternative to that, other circuit configurations may also be implemented, which may perform the selection and arbitration of a data exchange according to the present invention.

In the exemplary embodiment presented here, it is advantageous if the read request signal of the selected data sink influences the validity information of the data of the selected data source. Since counter 116 selects each data sink in succession, even if there is no request, this prevents undesired saving and thus faulty overwriting of data. If there is a read request, then the datum is marked as read in the data source and thus becomes invalid until a new datum is made available by the source (validity information invalid must change to valid). The validity signal transmitted with the data is the acknowledgement signal for a successful transmission and serves as the memory signal in the data sink. In another embodiment of the present invention, it is possible to select the corresponding read request signal of the data sink by two bits xy as a request signal. The four possible states of two bits xy may have the following meaning, as presented in Table 1, for example.

TABLE 1

Possibility of coding of read request bits x and y in arbitration of the data sink.

| Value | xy | Name | Meaning |
|---|---|---|---|
| 0 | 00 | No request | No data requested from data sink |
| 1 | 01 | Single read | Requested data become invalid after provision in source |
| 2 | 10 | Burst read | Requested data become invalid after provision in source; new data are immediately provided; counter not incremented for arbitration |
| 3 | 11 | Multiple read | Requested data remain valid in source after provision |

The "value" column in Table 1 is understood to be the decimal equivalent of two bits xy. At value 0, there is no read request and the datum remains valid at the source. At value 3, multiple read operations are subsequently provided; the datum also remains valid in this case. In the two other cases (value 1 and value 2), the datum becomes invalid after being read and must be replaced at the same address for the next read operation. The case with value 1 corresponds, for example, to the data exchange operation described with regard to FIG. 1.

In the case of a burst read (value=2), the next data should be available already in the next clock cycle in each case. In this case, it is also possible for new data to be made available by another source by changing the sent address. In addition, it should be noted that counter 116 is not incremented or in general the arbitration unit does not run further as long as a burst read is active. A certain data sink thus remains selected. The function of a burst read is advantageously implementable through the implementation of such an exemplary embodiment, but a constant cycle time is no longer assignable in the embodiment with the described burst option, as was advantageous in the simple case (only "no request" or "single read").

Control signals x and y are transmitted together with the corresponding address and are also delayed in the same way in the case of a delay (for example, due to pipeline stages, see also description further below). This is also true of the validity signal in conjunction with the transmitted data. In the case of a burst access, the maximum data throughput of one datum per cycle is achievable if both the data source and the data sink support this rate.

Other, in particular more complex, request signal variants are of course also possible and the 2-bit variant presented above and the simpler 1-bit variant ("no request" or "single read") represent only the simplest basic variants.

In another advantageous embodiment of the method according to the present invention or the circuit configuration according to the present invention, counter 116 used for arbitration may count in any code or need not select all data sinks in each cycle by being reset to 0, for example, before reaching the value m−1. It is possible in this way, for example, that some data sinks are operated more often than others. In time-critical systems, one may thereby optionally refrain from a division using additional hardware for parallelization.

Furthermore, in another exemplary embodiment, arbitration is possible, meaning an acceleration for certain data sinks, depending on the requirement, such as, for example, event-controlled setting of counter 116 at a certain value and then further incrementation from there. For example, a CPU present externally may set counter 116 at a certain value as a function of a certain event and thereby force the arbitration of a sink, other sinks then being skipped, if necessary. Incrementation in the form otherwise customary is then performed from the set value, for example. The same principle naturally also applies in the case of source arbitration, which is described further below for forcing arbitration of a certain data source. Event-controlled setting of an arbitration unit is also not limited to the example of a counter 116 but instead may also be advantageous for arbitration units implemented otherwise.

In such an embodiment, flexible access to the arbitrated data nodes is thus possible, in contrast with an embodiment having a fixedly predefined sequence (and without a burst option) but it is impossible to specify a constant cycle time. Depending on the application, both types of embodiments may be advantageous.

Figure 2:
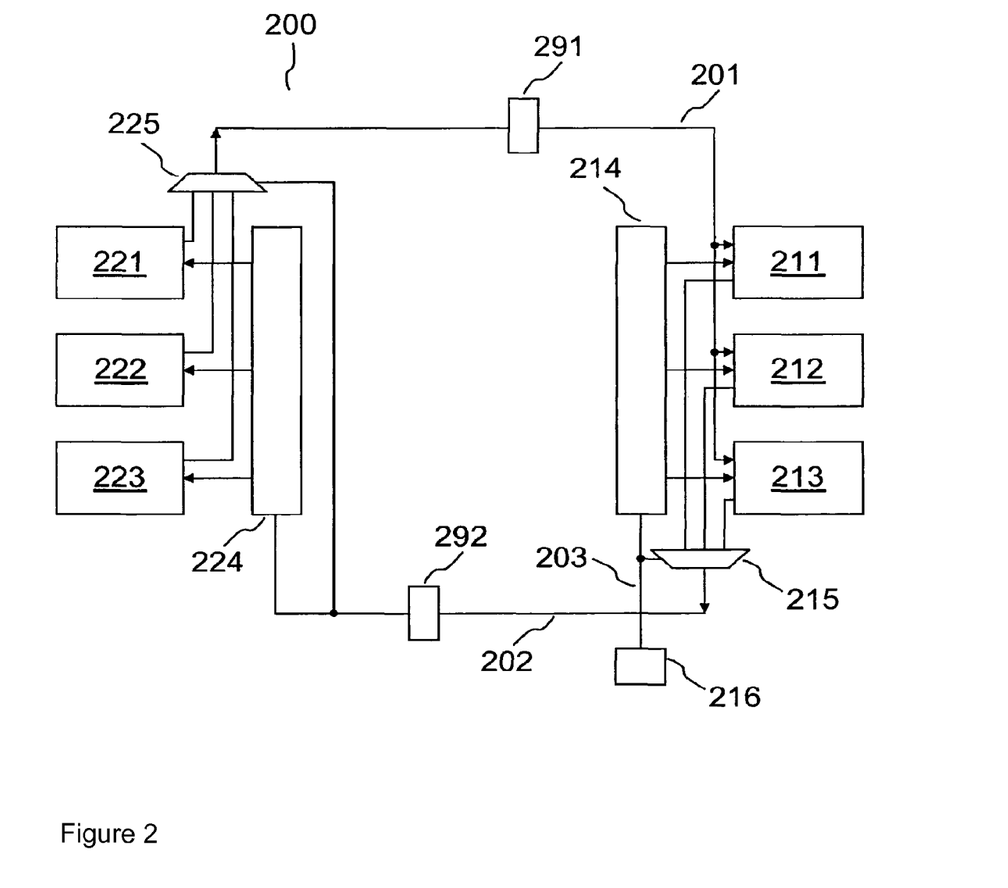
FIG. 2 shows a circuit configuration for a data exchange having pipeline registers.

If the period of time for requesting and storing data within a clock cycle is not sufficient, in another advantageous embodiment of the data exchange according to the present invention, it is possible to insert pipeline registers or comparable delay units into the address path and communication link 101 for the request and/or into the data supply path or communication link 102. FIG. 2 shows such a specific embodiment of a circuit configuration according to the present invention having pipeline registers.

Circuit configuration 200 in FIG. 2, similar to circuit configuration 100 from FIG. 1, has data sinks 211, 212, 213, data sources 221, 222, and 223, communication links 201, 202 and 203, a 1-of-m decoder 214, a 1-of-n decoder 224, multiplexers 215 and 225 as well as a counter 216. The elements are linked together or connected as described with reference to FIG. 1. In addition, a pipeline register 291 is integrated into communication link 201 in FIG. 2 and pipeline register 292 is integrated into communication link 202.

These pipeline registers 291 and 292 may have any depth, for example, data are delayed by A cycles in communication link 102, while data in communication link 101 are delayed by B cycles. In this case, saving of data in the selected data sink must be delayed by A+B cycles. However, it is not necessary for counter 116 to retain its value so long but instead it may continue counting with each cycle and in this case also ensures that all sinks 111, 112, 113 have been queried exactly once after m cycles, for example.

The pipeline stages may be distributed among various stages in a hierarchically structured multiplexer, for example. It is necessary only to be sure that each path from an input to an output of the multiplexer is delayed at exactly the same number of pipeline register stages. The same is also true of other delay measures. Furthermore, it is important for the select signal of the selected data sink in the response through the selected data source in a pipeline register delay and the continuously running counter to be designed as a second select signal and for this second select signal to be delayed by the duration of the data exchange operation described above with regard to FIG. 1 plus the delay of pipeline registers 291 and 292. The embodiment of a second delayed select signal of the selected data sink in response by the selected data source may also be advantageous independently of the use of pipeline registers or other delay units. Corresponding embodiments with data delay through pipeline registers and/or with adaptation of selection signals are also advantageous in the case of data source arbitration.

In another embodiment of the data exchange according to the present invention, it is possible to divide the set of data sinks m into multiple (sub)sets m1, m2 ... mp of the same size or different sizes and to provide a counter for parallel work for each of these (sub)sets. Each of these (sub)sets is thus assigned an arbitration unit. The advantage of this configuration is that multiple data transfers may be processed simultaneously and the maximum data throughput of the configuration as a whole is determined by the largest subset m1, m2 ... mp.

Figure 3:
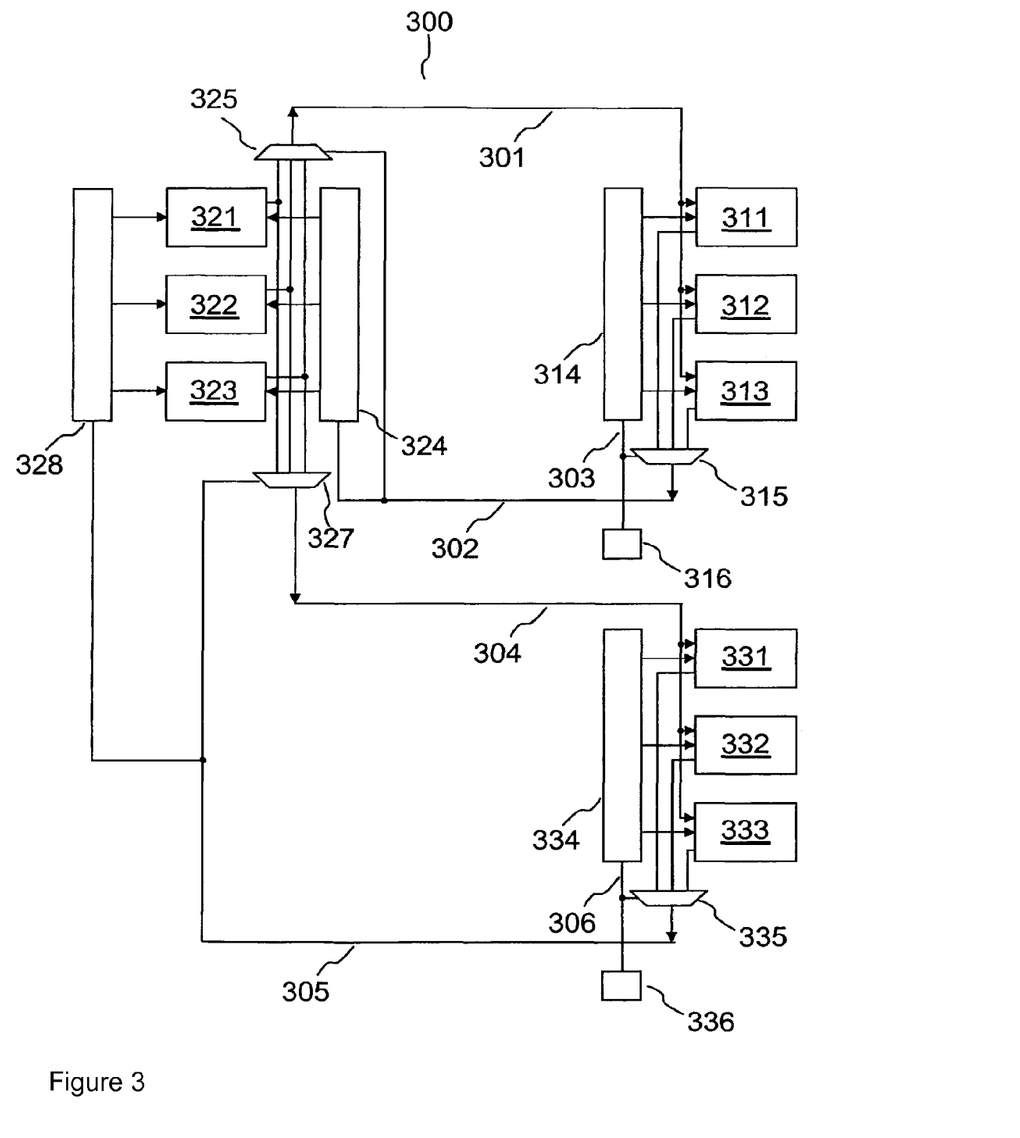
FIG. 3 shows a circuit configuration for a data exchange having parallel access options.

FIG. 3 shows a corresponding embodiment of a circuit configuration according to the present invention in a variant having p=2. Circuit configuration 300 has data sinks 311, 312, 313, 331, 332 and 333, data sources 321, 322 and 323, a 1-of-m1 decoder 314, a 1-of-m2 decoder 334, a 1-of-n1 decoder 324, a 1-of-n2 decoder 328, multiplexers 315, 325, 327 and 335, counters 316 and 336 as well as communication links 301 through 306.

The 1-of-m1 decoder 314 has access to data sinks 311, 312 and 313 and is connected via a communication link 303 to a select input of multiplexer 315 and also to counter 316. Data sinks 311, 312 and 313 are each connected to an input of multiplexer 315. The output of multiplexer 315 is connected to a communication link 302, this communication link 302 being connected to 1-of-n1 decoder 324 as well as to a select input of multiplexer 325. The 1-of-n1 decoder 324 has access to data sources 321, 322 and 323. Data sources 321, 322 and 323 are each connected to an input of multiplexer 325 and via the same communication link are each connected to an input of multiplexer 327. In addition, the output of multiplexer 325 is connected to a communication link 301, this communication link 301 being connected to each of data sinks 311, 312 and 313.

The 1-of-m2 decoder 334 has access to data sinks 331, 332 and 333 and is connected via a communication link 306 to a select input of multiplexer 335 and also to counter 336. Data sinks 331, 332 and 333 are each connected to an input of multiplexer 335. The output of multiplexer 335 is connected to a communication link 305, this communication link 305 being connected to 1-of-n2 decoder 328 as well as to a select input of multiplexer 327. The 1-of-n2 decoder 328 has access to data sources 321, 322 and 323. The output of multiplexer 327 is connected to a communication link 304, this communication line 304 being connected to each of data sinks 331, 332 and 333.

Using two counters 316 and 336, it is possible in this exemplary embodiment to select the same or any (sub)set n1 and n2 of data sources 321, 322, 323 from the two (sub)sets of data sinks 311, 312, 313 and 331, 332, 333. Since reading simultaneously from the same data source is possible in principle, two different sinks are able to process the same datum. If reading access to the same data source is in chronological sequence, the second reading operation is either invalid or the data may be different because the data source has supplied new data in the meantime.

In the event of simultaneous access to a same data source by different data sinks, a collision problem would occur in the exemplary embodiment presented here. Therefore, either such a case must be precluded (for example, by tuning the arbitration of the various (sub)sets or, for example, by querying each source only from one of the data sink (sub)sets or even from only one certain data sink) or the circuit configuration must be adapted, for example, in comparison with the exemplary embodiment shown here, through additional data source outputs plus corresponding links.

Figure 4:
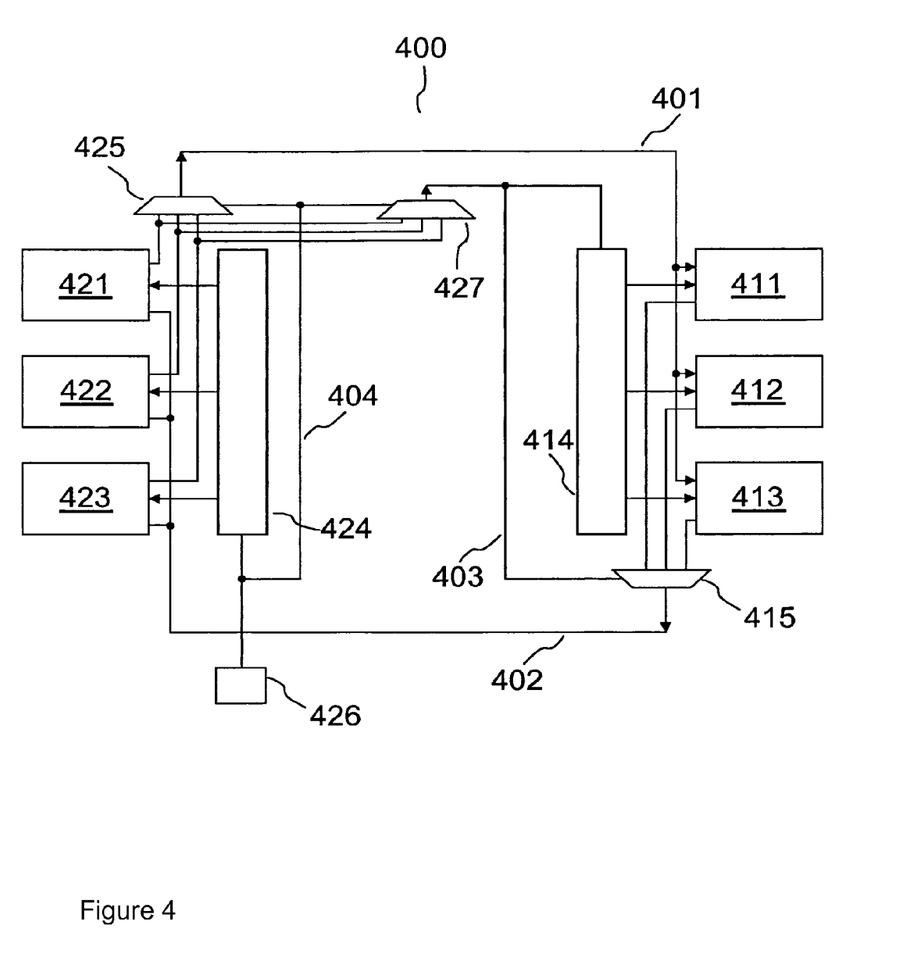
FIG. 4 shows a circuit configuration for a data exchange with arbitration of the data sources by a counter.

Instead of the selection of m data sinks 111, 112, 113 by counter 116 and 1-of-m decoder 115 in FIG. 1, it is conversely also possible to arbitrate the n data sources. FIG. 4 shows accordingly an embodiment of a circuit configuration according to the present invention. Circuit configuration 400 here has data sinks 411, 412, 413, data sources 421, 422, 423, communication links 401, 402, 403 and 404, a 1-of-m decoder 414, a 1-of-n decoder 424, multiplexers 415, 425 and 427 as well as a counter 426. The 1-of-m decoder 414 has access to data sinks 411, 412 and 413. Data sinks 411, 412 and 413 are each connected to an input of multiplexer 415. The output of multiplexer 415 is connected to a communication link 402, this communication link 402 being connected to data sources 421, 422 and 423. The 1-of-n decoder 424 has access to data sources 421, 422 and 423 and is connected via a communication link 404 to a select input of multiplexer 425, to a select input of multiplexer 427 and to counter 426. Data sources 421, 422 and 423 are each connected to an input multiplexer 425 and are each connected to an input of multiplexer 427 via the same communication links. In addition, the output of multiplexer 425 is connected to a communication link 401, this communication line 401 being connected to each of data sinks 111, 112 and 113. Furthermore, the output of multiplexer 427 is connected via a communication line 403 to 1-of-m decoder 414 and to a select input of multiplexer 415.

The operating modes of the multiplexers, the decoders and the counter are similar to the description of the data sink arbitration from FIG. 1. In this embodiment (circuit configuration 400), all data sources 421, 422, 423 are arbitrated/selected one after the other in fixed sequence, in this embodiment by counter 426, regardless of whether the corresponding source has a datum and, associated with that, has a write request (or a request signal), which is determined by the validity information mentioned above. The selected data source transmits the data supplied together with the above-mentioned validity signal via communication line 401 to all data sinks 411, 412, 413 and additionally transmits an address via communication line 403 to 1-of-m decoder 414. The data sink thereby selected receives a select signal formed from the address. The readiness signal (read request) present at the data sink indicates whether the data sink is ready to receive new data. A write signal is generated from the validity information of the jointly transmitted validity signal and the readiness of the data sink to receive the data. Using this write signal, data are transferred to the memory and at the same time the read request signal of the selected data sink is reset. At the same time, the write signal is the acknowledgement signal of successful transmission and is sent back from the selected data sink to the selected data source to influence the validity information there, precisely to mark the datum as read and thus reset the write request.

Again in this embodiment of an arbitration of sources 421, 422, 423, a delay in the signals via pipeline stages or other delay mechanisms is possible, as described with regard to FIG. 2. It should be noted here that the select signal of the data source to form the marking signal "read" is delayed by as many cycles as the data path to the data sink together with the acknowledgement signal transmitted back is delayed. This delayed select signal is linked to the acknowledgement signal to perform a marking. Thus a marking of the correct source in the case of delay through pipeline stages is possible even if additional data sources have also been serviced by the arbiter (counter) 426 in the meantime.

Again in the exemplary embodiment of arbitration of data sources 421, 422, 423 in FIG. 4, it is possible that one datum is transmitted to multiple data sinks 411, 412, 413. In addition to the address, the request signal must then be transmitted as a write request signal having at least two bits x and y, as shown in Table 2 as an example. The write request of the source is the request signal, and the read request of the data sink is the acknowledgement signal.

Table 2 for data source arbitration is similar to Table 1 for data sink arbitration. In the case of a value 0, there is no request, no data are provided by the data sources/the data of the data sources are not valid. In the case of the value 1, data exchange as described with regard to FIG. 4 takes place. Thus a simple formation of a request signal, for example, even by 1 bit (0 "no request," 1 "single write") would also be conceivable. Additional values 2 and 3 of the 2-bit variant for the request signal in the exemplary embodiment of the source arbitration allow implementation of the burst write and multiple write options, for example.

TABLE 2

Possibility of coding write request bits x and y during arbitration of the data source.

| Value | xy | Name | Meaning |
|---|---|---|---|
| 0 | 00 | No request | No data provided by data source |
| 1 | 01 | Single write | Data provided are marked as read in the source after the write signal (acknowledgement) of the sink |
| 2 | 10 | Burst write | Data provided become invalid in the source after acknowledgement of the sink; new data are provided immediately and transmitted; counter for arbitration is not incremented. |
| 3 | 11 | Multiple write | Requested data remain valid even after being provided in the source. |

In the case of the burst write option, data provided become invalid in the source after acknowledgement of the sink, new data are provided immediately and transmitted. For this purpose, a new address may optionally also be transmitted if the data source would like to transmit to various sinks. The counter is not incremented in a burst write operation and the arbitration is not advanced further which in this exemplary embodiment in turn results in a loss of the advantageous constant cycle time in favor of a more flexible data transmission, as described above in the case of the burst read. For the multiple write option, the requested data remain valid after being provided in the source.

Again in the case of arbitration of data sources 421, 422, 423, there is the possibility of subdividing them into multiple configurations operating in parallel. For this purpose, the data sources are subdivided into multiple (sub)sets and an arbitration unit, for example, a counter, which selects a data source in these (sub)sets which is assigned to each (sub)set. Transmission to data sinks 411, 412, 413 then takes place on parallel data buses and address buses. The exemplary embodiments (for example, pipelining, multiple parallel configurations, dynamic arbitration, variable counter code, second select signal) are all equally valid in general for data exchange according to the present invention in the case of source arbitration as well as in the case of sink arbitration.

What is claimed is:

1. A method for controlling a data exchange between at least one set of data sinks and at least one set of data sources in a circuit configuration having at least one arbitration unit, comprising:

selecting by the arbitration unit a first data sink from the at least one set of data sinks according to a predefined sequence;

outputting by the first data sink an address of a first data source and a request signal;

selecting, using the address outputted by the first data sink, the first data source from the at least one set of data sources;

outputting by the first data source data and at least one validity signal;

forwarding the data output by the first data source to all data sinks of the at least one set of data sinks; and saving by the first data sink the forwarded data.

2. The method for controlling a data exchange between at least one set of data sinks and at least one set of data sources in a circuit configuration having at least one arbitration unit, comprising:

selecting by the arbitration unit a first data source from the at least one set of data sources according to a predefined sequence;

transmitting by the first data source (i) data provided in the first data source together with a validity signal of a first data sink to all data sinks of the at least one set of data sinks, and (ii) an address of the first data sink to a selection unit;

selecting, using the transmitted address, the first data sink from the at least one set of data sinks;

storing the transmitted data in the first data sink and adapting a readiness information of the first data sink as a function of the validity signal; and sending to the first data source an acknowledgement signal representing a successful transmission of the data.

3. The method as recited in claim 1, wherein at least one data node functions as at least one data sink and also as at least one data source.

4. The method as recited in claim 1, wherein the data exchange takes place between at least two sets of data sinks and the at least one set of data sources, and wherein at least one arbitration unit is assigned to each set of data sinks.

5. The method as recited in claim 2, wherein the data exchange takes place between at least two sets of data sources and the at least one set of data sinks, and wherein at least one arbitration unit is assigned to each set of data sources.

6. The method as recited in claim 5, wherein the sets of data sources assigned to different arbitration units overlap.

7. The method as recited in claim 1, wherein the request signal of the first data sink influences the validity signal of the first data source.

8. The method as recited in claim 2, wherein the acknowledgement signal influences the validity signal of the first data source.

9. The method as recited in claim 1, wherein the arbitration unit is a counter, and wherein the request signal affects incrementing of the counter.

10. The method as recited in claim 1, wherein the arbitration unit deviates from the predefined sequence in the case of a predefined event and selects a predefined data sink.

11. The method as recited in claim 1, wherein the forwarding of the data output by the first data source is delayed by a delay unit.

12. A circuit configuration for a data exchange between at least one set of data sinks and at least one set of data sources, the circuit configuration comprising:

an arbitration unit configured to select a first data sink from the at least one set of data sinks according to a predefined sequence;

means for processing and transmitting a first output of an address of a first data source and a request signal from the first data sink;

means for selecting the first data source from the set of data sources using the address outputted by the first data sink;

means for processing a first output of data and at least one acknowledgement signal from the first data source;

means for forwarding the data output by the first data source to all data sinks of the at least one set of data sinks; and means for saving the data in the first data sink.

13. A circuit configuration for a data exchange between at least one set of data sinks and at least one set of data sources, the circuit configuration comprising:

an arbitration unit configured to select a first data source from the at least one set of data sources according to a predefined sequence;

means for transmitting (i) data provided by the first data source together with a validity signal of a first data sink to all data sinks of the at least one set of data sinks, and (ii) an address of the first data sink:

means for selecting the first data sink from the at least one set of data sinks, wherein the means for selecting receives the address of the first data sink from the means for transmitting and uses the received address to store the transmitted data in the first data sink and adapts a readiness information of the first data sink as a function of the validity signal; and means for sending to the first data source an acknowledgement signal representing a successful transmission of the data.

14. The circuit configuration as recited in claim 12, further comprising:

at least one delay unit configured to delay the forwarding of the data output by the first data source.

15. The circuit configuration as recited in claim 12, wherein the data exchange takes place between at least two sets of data sinks and the at least one set of data sources, and wherein at least two arbitration units are provided, each arbitration unit being assigned to a corresponding set of data sinks.

16. The circuit configuration as recited in claim 13, wherein the data exchange takes place between at least two sets of data sources and the at least one set of data sinks, and wherein at least two arbitration units are provided, each arbitration unit being assigned to a corresponding set of data sources.

* * * * *

UNITED STATES PATENT AND TRADEMARK OFFICE
CERTIFICATE OF CORRECTION

PATENT NO. : 8,499,113 B2 Page 1 of 1
APPLICATION NO. : 13/138607
DATED : July 30, 2013
INVENTOR(S) : Boehl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 113 days.

Signed and Sealed this
Fifteenth Day of September, 2015

Michelle K. Lee
*Director of the United States Patent and Trademark Office*